Feb. 20, 1968    F. F. MILLER, JR    3,369,378
RETAINING RING AND GROOVE ASSEMBLY FOR A UNIVERSAL JOINT
Filed Feb. 9, 1966    2 Sheets-Sheet 1

INVENTOR.
FRED F. MILLER JR.
BY *Harold D. Hall*
*Walter E. Pavlick*
ATTORNEYS

Feb. 20, 1968     F. F. MILLER, JR     3,369,378
RETAINING RING AND GROOVE ASSEMBLY FOR A UNIVERSAL JOINT
Filed Feb. 9, 1966     2 Sheets-Sheet 2

INVENTOR.
FRED F. MILLER JR.
BY Harold D. Shall
Walter E. Pavlick
ATTORNEYS

United States Patent Office 3,369,378
Patented Feb. 20, 1968

1

3,369,378
RETAINING RING AND GROOVE ASSEMBLY
FOR A UNIVERSAL JOINT
Fred F. Miller, Jr., Sylvania, Ohio, assignor to Dana
Corporation, Toledo, Ohio, a corporation of
Virginia
Filed Feb. 9, 1966, Ser. No. 526,088
18 Claims. (Cl. 64—17)

ABSTRACT OF THE DISCLOSURE

A snap ring arrangement for preventing relative axial movement between a first member having an open bore therein and a second member received in this bore. One of the members has a shoulder thereon abutting the snap ring and the other member has a groove therein which receives the snap ring; the groove being shaped so as to prevent the snap ring from dishing when the second member attempts to move out of the bore of the first member.

This invention relates to securing means generally and more particularly to means for preventing relative axial movement between members in at least one axial direction in the form of a resilient ring member disposed in a groove means in one of the members and engaging the other member.

One common method for holding two members against relative axial displacement employs a resilient retaining ring member disposed in an annular groove means in one of the members and abuttingly engaging the other member; the cross-sectional configuration of the groove means being substantially the same as the cross-sectional configuration of the portion of the retaining ring member received thereby while being slightly wider than the same. Retaining means of this type offer a simple solution to many of the retaining and positioning problems commonly encountered where it is desired to secure various machine elements in an assembled relationship. When such a resilient ring member is snapped into an annular groove provided on a shaft or in a housing, it provides a shoulder for locating, retaining or securing component parts in an assembled relationship; for example, a gear means mounted on a shaft, a bearing disposed in a bore or on a shaft and a trunnion in an opening such as employed in a Cardan type universal joint.

In a typical ring and groove assembly the axial thrust loads imposed thereon are transmitted from a retained member to the retaining ring and thence to the abutting wall of the groove means, or vice versa. As a consequence, the strength of the groove wall and the ring, the amount of contact area between the retaining ring and the groove wall and the tolerance and shape of the cooperating elements determine to a large degree the thrust capacity of the assembly and the positioning ability of the retaining ring.

Failure of the retaining ring and groove means assembly usually occurs when the design capacity of the thrust loads have been exceeded. When a ring member fails under maximum impact or thrust loads it can break apart; while failure of the groove wall caused by such loading can be due to deformation of the groove wall conically flaring out. Another common cause of failure to properly position the members results from dishing of the ring member in a conical manner and the presence of excessive tolerances thus allowing relative movement of the members to take place. When the ring member dishes, the groove wall will have a greater tendency to flare out conically since the groove wall becomes loaded at its outer edge portion. Also, as is the usual case, the width of the opening of the groove means is somewhat greater than the thickness of

2 the retaining ring member and as a consequence, since the retaining ring is not supported on its one face by a groove wall, the retaining ring can flex or pivot about the edge portion of the groove wall it is engaging and thus increase the tendency of the retaining ring member to dish outwardly.

It is therefore an object of this invention to provide a securing means having a groove means with an improved wall arrangement for seatingly supporting a resilient ring member.

Another object of this invention is to provide a securing means which includes means for inhibiting dishing of the resilient ring portion thereof.

Yet another object of this invention is to provide an improved securing means wherein there is a substantial contacting of various surfaces of the resilient ring and the groove wall portion thereof so that dishing of the resilient ring is inhibited.

A further object of this invention is to provide a securing means including a groove means having a pair of axially spaced walls and a resilient ring, the opening of the groove means into which the resilient ring is inserted being conventionally wider than the resilient ring means positioned therein and including means insuring that the ring means engages both said walls of the groove means.

Yet a further object of this invention is to provide a pair of elements which are held in an assembled relationship by means which are easily and yet securely constructed so that the elements will remain in their assembled relationship under operating conditions.

These and other objects and advantages of this invention will become apparent from the following detailed description when taken in connection with the accompanying drawings wherein.

Figure 2:
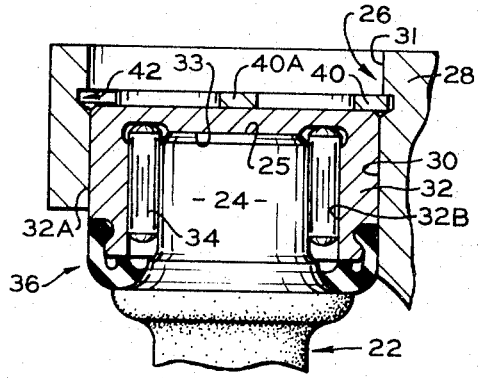
FIG. 2 is an enlarged sectional view of the yoke arm portion of one of the rotary members of the universal joint shown in FIG. 1 and of the various elements cooperatively disposed therewith.
Figure 8:
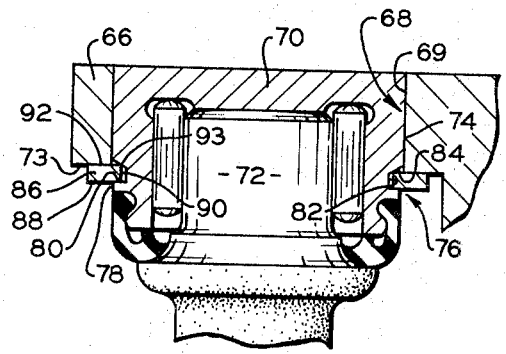
Figure 9:
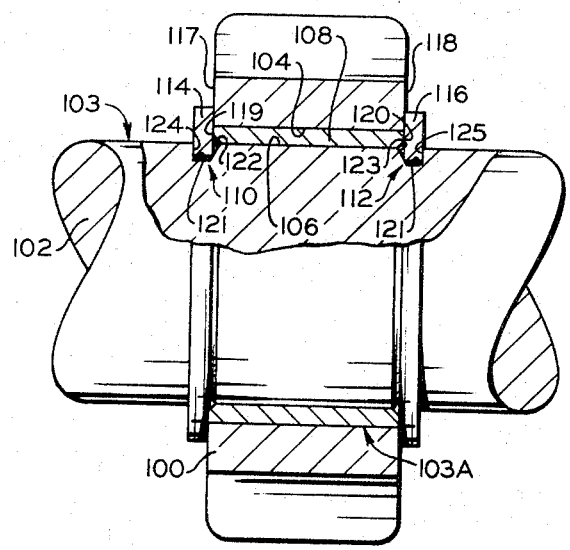

FIG. 8 is an enlarged longitudinal sectional view taken in a manner similar to FIG. 2, showing a different arrangement of the various elements cooperatively disposed in a yoke arm and wherein the retained member contains the groove means; and FIG. 9 is a longitudinal elevational view, shown partially in section, of a gear member which is mounted on a shaft and retained thereon by means embodying the invention.

A preferred embodiment of this invention is shown incorporated in a Cardan type universal joint assembly; the relatively angularly movable members of the universal joint each being provided with a pair of axially extending radially opposed lug elements with the lug elements of one member being interposed with respect to the lug elements of the other. The lug elements are pivotally and drivingly connected to the trunnions of an intermediate journal cross with the pivotal connection between the lug elements and the trunnion associated therewith being provided by a bearing race element pressedly received in an opening or bore in the lug element and with the bearing race element pivotally receiving the trunnion. One of the associated elements is provided with an annular groove means and a resilient ring is disposed in the groove means and engages the other of the associated elements in a manner such to inhibit relative movement therebetween; the groove means being constructed so as to inhibit pivotal dishing type deformation of the resilient ring while insuring that the resilient ring engages said other element.

Figure 1:
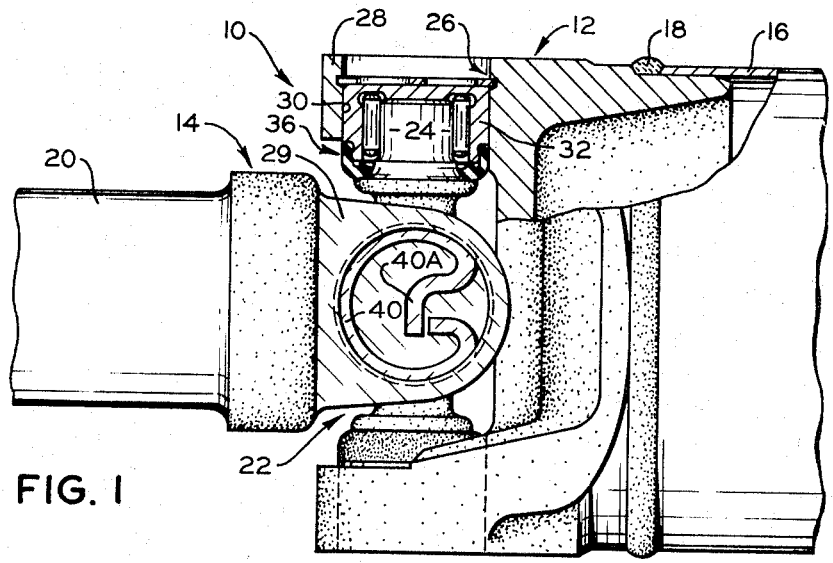
FIG. 1 is a longitudinal elevational view, shown partially in section, of an assembled universal joint portion of a drive line embodying the invention.
Figure 3:
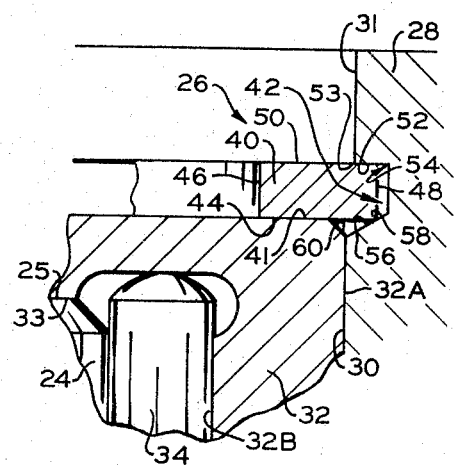
FIG. 3 is a further enlarged sectional view of a portion of the universal joint shown in FIG. 2.

Referring to the drawings and more particularly to FIGS. 1, 2 and 3, a Cardan type universal joint assembly is shown generally at 10 and includes a pair of yoke members 12 and 14. The yoke member 12, commonly referred to as a ball yoke, is conventionally pressed into a tubular shaft, shown fragmentarily at 16, and is secured thereto by a peripheral weld 18. The yoke member 14, commonly referred to as a sleeve yoke, is provided with an elongated shaft portion 20 adapted to be drivingly attached to an appropriate element (not shown) of a drive line.

A journal cross member 22, having four coplanar trunnions which are circumferentially equally spaced, is conventionally provided for drivingly connecting the yoke members 12 and 14; two of the trunnions being connected to each of the yoke members. The cooperation between the trunnions and the yoke members will be described with respect to one of the trunnions which is indicated by the numeral 24. The trunnion 24 is disposed in a cross hole or bore 26 formed in an arm 28 of the yoke member 12; the yoke member having the usual pair of radially spaced and opposed arms extending axially therefrom when considered with respect to the longitudinal axis of the yoke. Each of the arms 28 has a cross hole 26 therein; the cross holes in the arms of the yoke member 12 being coaxial with each other and such coaxial axes lying in a plane perpendicular to the longitudinal axis of the yoke 12. Hereinafter, with respect to the cross hole 26 and the various structures cooperating therewith and formed therein, the use of the term axially shall be with respect to the axis of the cross hole.

Interposed between the trunnion 24 and the peripheral wall 30 of the axially inner portion of the cross hole 26 receiving the trunnion is a cup shaped bearing race 32. The cylindrical periphery 32A of the race 32 engages the wall 30, having been pressed into the same from the axially outer end of the cross hole 26. An annulus of needle bearings 34 is disposed between the cylindrical periphery of the trunnion 24 and the cylindrical inner peripheral wall 32B of the bearing race 32 to provide for a substantially frictionalless engagement therebetween, while the axially inner transverse wall 33 of the race 32 is in a closely spaced and thrusting relationship with the axially outer transversely extending end 25 of the trunnion 24. A sealing means shown generally at 36 engages the periphery of the bearing race 32 adjacent the open end thereof and an adjoining portion of the trunnion 24 to provide a sealing arrangement therebetween and thereby prevent the egress of lubricant from within the bearing race and the ingress of contaminants into the bearing race.

The yoke member 14 is also provided with a pair of opposed arms 29 which extend axially therefrom when considered with respect to the longitudinal axes of the yoke member 14, which arms are pivotally and drivingly connected to opposed trunnions formed on the journal cross 22 at right angles to the trunnion 24.

Once the bearing race 32 has been positioned in the cross hole 26 of the arm 28 and engaging the wall 30, it is maintained from moving axially outwardly with respect thereto by means of a resilient ring member 40, commonly referred to as a snap ring. The snap ring 40 is disposed in an annular receiving means in the form of an annular groove 42 with the axially inner transversely extending face of the ring 40 adjacent the radially inner periphery 46 thereof abuttingly engaging the axially outer transversely extending face or shoulder 41 of the race 32 and the axially outer transversely extending face 50 of the ring 40 adjacent the outer periphery 48 thereof abuttingly engaging the axially outer wall 52 of the groove 42. The snap ring 40 is of the conventional type which is circumferentially interrupted and diametrically compressible; the diameter of the ring in its free state being greater than the diameter of the groove 42. The snap ring 40 (see FIG. 1) has a pair of legs 40A extending radially inwardly from the circumferentially spaced ends thereof which legs may be suitably forced toward each other to reduce the ring's diameter and then, after the ring is cooperatively positioned with the groove 42, the force on the legs is released and the ring diametrically expands into the groove. More particularly, the annular groove 42 is formed in the arms 28 within the cross hole 26 thereof, the groove being positioned at the axially outer end of and terminating the wall 30, while the wall of the cross hole 26 disposed axially outwardly of the groove 42 and indicated by the numeral 31 is machined to a conventional larger diameter than the diameter of wall 30 and also larger in diameter than the diameter of the external periphery 32A of the race 32; the axially inner end of the wall 31 terminates at the groove 42. The purpose for the larger diameter of the wall 31 is twofold. Since the bearing race 32 is pressed into the cross hole 26 from the axially outer end thereof, the larger diameter wall portion 31 provides a conterbore which serves as a piloting means for preliminary insertion of the race 32 into the cross hole so that the race easily slips into the cross hole until the axially inner end of the race contacts the inner wall 30. Further, such larger diameter prevents a pressed fit from occurring between the wall 31 and the race 32 so that upon the latter's insertion into the cross hole, the race will not deform any of the wall 31 into the groove 42 or deform the axially outer wall 52 of the groove. In a universal joint member having a cross hole 26 with an inner wall 30 which is approximately one inch in diameter, the wall 31 is provided with a diameter approximately .014 inch larger than the diameter of the wall 30; such dimensional relationship being similar to those conventionally found in the prior art. The radially outer periphery 54 of the groove 42 extends axially inwardly from the axially outer wall 52 of the groove a distance which is less than the axial thickness of the snap ring 40, thus, the axially inner end of the wall 54 is spaced axially outwardly from the axially outer face 41 of the race 32. The axially inner wall 56 of the groove 42, when viewed in cross section as seen in FIGS. 1–3, extends axially and radially inwardly from the peripheral wall 54 of the groove such that, at the opening of the groove 42 with the cross hole 26, the radially inner edge of the wall 56, that is, the junction of the wall 56 and the peripheral wall 30, is disposed axially inwardly of the axially outer face 41 of the race 32 and the axially inner face 44 of the ring 40, and the groove opening overlaps the outer face 41 of the race. Thus, the axially outer and inner walls 52 and 56 of the groove 42 are nonparallel, the opening of the groove has a greater axial dimension than the axial dimension of the radially outer periphery 48 of the groove, the inner wall 56 extends axially inwardly and outwardly of the outer face 41 of the race and the inner wall 56 faces the outer face 41. The axially inner wall 56, when viewed in cross section as seen in FIGS. 1–3, is rectilinear so that the entire annular inner wall is of truncated conical configuration; however, it should be understood that the wall 56 can vary somewhat from its rectilinear nature while retaining its incline and nonparallel relationship in addition to the size relationship of the groove opening and the groove peripheral wall, such as by being slightly convexly or concavely arcuate when viewed in cross section.

Since the portion of the outer face 50 of the ring 40 adjacent the periphery 48 thereof engages the axially outer wall 52 and the peripheral wall 54 of the groove is of lesser axial dimension than the ring 40, the radially outer and axially inner edge 58 of the ring 40, formed by the junction of the outer periphery 48 and the axially inner face 44 of the ring, engages the axially inner inclined wall 56 of the groove and the outer periphery 48 of the ring is spaced from the peripheral wall 54 of the groove.

While it is not a necessity, the radially and axially outer edge 60 of the bearing race 32, formed at the junction of the outer face 41 and peripheral wall 32A of the bearing race, is conventionally relieved or chamfered so that a sharp junction does not exist between the outer face and peripheral wall, which sharp junction would be highly susceptible to chipping.

In the prior art securing means comprising a snap ring disposed in an annular groove means and as exemplified by United States Patents 2,032,497 and 2,794,693, the groove means is conventionally formed with parallel axially outer and inner walls and with the axial distance between such walls being greater than the axial thickness of the snap ring received thereby. Accordingly, when the snap ring is positioned in the groove, the periphery of the snap ring engages the peripheral wall of the groove and the axial faces of the snap ring engage the axially outer wall and the axially outer face of the retained member and, thus, the axially inner face of the snap ring is axially spaced from the axially inner wall of the groove. Since the axially outer portion of the cross hole beyond the groove has a diameter which is larger than the diameter of the bearing race, axially outwardly thrust loads on the snap ring induced by the bearing race adjacent the radially inner periphery thereof tend to pivotally deform the snap ring to a dished configuration, with the snap ring pivoting about the edge defined by the junction of the axially outer wall of the groove and the axially outer wall of the cross hole; such edge being disposed radially outwardly with respect to the radial displacement of the periphery of the bearing race. This radial displacement in addition to the chamfered corner of the bearing race accommodate the pivotal deformation of the snap ring and, since the axially inner wall of the groove does not engage the snap ring, the radially outer portion of the snap ring can move axially inwardly while the radially inner portion of the snap ring can move axially outwardly to accommodate such pivotal movement.

Referring again to FIGS. 1–3, it is seen that axially outwardly thrust loads induced on the snap ring 40 by the axially outward movement of the bearing race 32 tends to pivotally deform the snap ring so that the radially inner portion thereof is urged to move axially outwardly while the radially outward portion thereof is urged to move axially inwardly; however, as a result of the engagement of the radially outer and axially inner edge 58 of the ring 40 with the axially inner wall 56, the radially outer portion of the ring can not move axially inwardly. Thus, the snap ring 40 can not pivot about the edge 53 formed by the junction of the walls 31 and 52 and any deflection of the ring 40 must be of a resilient bending nature; the snap ring resisting such a bending to a much higher degree than it resists the pivotal dishing described with respect to the prior art structures.

Figure 4:
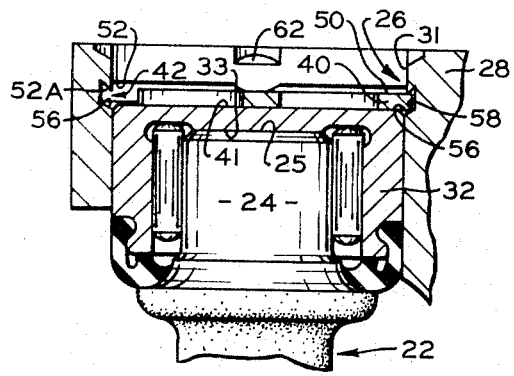
FIG. 4 is a view similar to FIG. 2 showing a modification of the embodiment of FIG. 1.
Figure 5:
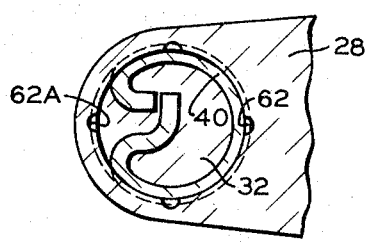
FIG. 5 is a plan view of the embodiment shown in FIG. 4.

Referring now to FIGS. 4 and 5, it is seen that the structure shown in FIGS. 1–3 can be modified to insure that the build-up of tolerances in the assembly of the universal joint elements does not result in an undesirable space existing between the axially inner wall 33 of the bearing race 32 and the axially outer thrust face 25 of the trunnion 24, which wall and face it is desired to maintain in a closely spaced relationship while still allowing the race to pivot freely about the trunnion. More particularly, the arm 28 at circumferentially spaced locations about the axially outer end of the cross hole 26 has been deformed axially inwardly by an operation commonly referred to as staking so that a plurality of staked locations 62 exist. Four such equally spaced locations 62 are shown in FIG. 5, one of them, shown at 62A, being positioned at a location intermediate the circumferential ends of the snap ring 40 so that in the event the snap ring 40 is later removed and repositioned in the groove 42, at least three of the stakes 62 will be disposed cooperatively with respect to the snap ring to properly position the latter.

The staked locations 62 force the axially outer wall 52 axially inwardly as shown at 52A so as to move the snap ring 40 into firm thrusting engagement with the outer face 41 of the bearing race 32 and thus move the axially inner face 33 of the bearing race into a closely spaced relationship with the thrust face 25 of the trunnion 24; it being understood that the deforming operation in which the staked locations 62 are formed is performed after the assembly of the bearing race, trunnion and snap-ring are positioned in the yoke 12 and the journal cross 22 is preferably maintained in a centralized relationship with respect to the yoke. It is thus assured that the journal cross 22 is centralized and will remain centralized with respect to the yoke.

During such stacking operation, depending upon the hardness of the material from which the yoke arm 28 is manufactured, and thus the hardness of the axially inner wall 56, the axially inner and radially outer edge 58 of the snap ring 40 will either be embedded into the inner wall 56 or will slide radially inwardly therealong to accommodate such axially inward movement of the axially outer wall of the groove 52 at the locations 52A. Since the edge formed by the junction of the walls 31 and 52 at the location 52A engages the axially outer face 50 of the snap ring and the axially inner wall 56 of the groove engages the radially outer and axially inner edge 58 of the snap ring, pivotal dishing of the snap ring is restrained in the same manner as it was with respect to FIGS. 1–3.

Figure 6:
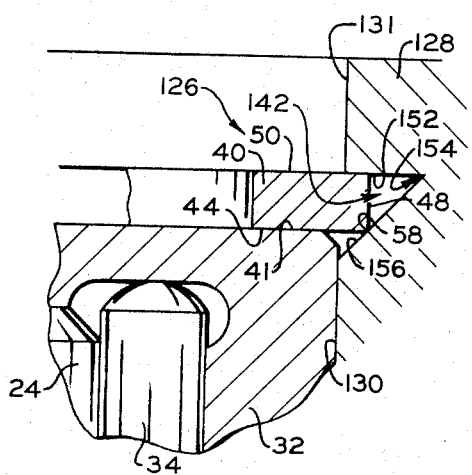
FIGS. 6 and 7 are enlarged sectional views, taken in a manner similar to FIG. 3, of portions of the element containing the groove means showing other modifications of the invention.

Referring now to FIG. 6, it is seen that a groove 142 of slightly modified configuration, when compared to the groove 42 of FIGS. 1–3, can be utilized for the purposes of this invention; which groove is formed in a cross hole 126 disposed in a yoke arm 128. The axially outer wall 152 of the groove is formed substantially the same as the wall 52 of the groove 42 and engages the axially outer face 50 of a snap ring 40 received in the groove; however, there is no distinct radially outer peripheral wall of the groove 142. Instead, the axially inner wall 156 of the groove extends from the radially outer end of the wall 152 both axially and radially inwardly so that it intersects the axially inner wall 130 of the cross hole 126 at a location axially inwardly with respect to the axially inner face 44 of the snap ring 40 and the axially outer face 41 of the bearing race 32 received in the cross hole; the wall 156 extending both axially inwardly and outwardly of the outer face 41 as does the wall 56 in FIGS. 1–3. Accordingly, in effect, the peripheral wall of the groove 142 resides solely in the junction of the axially outer and axially inner walls 152 and 156 and is indicated at 154. Thus, as with the embodiments of FIGS. 1–3, the annular groove 142 terminates the wall 130 of the cross hole 126 and the opening of the groove into the cross hole is larger in axial dimension than the periphery 154 of the groove and, further, the groove opening is larger in axial dimension than the axial dimension of the snap ring 40 and overlies the axially outer face 41 of the bearing race 32. Since the axially outer face 50 of the snap ring 40 engages the axially outer wall 152 of the groove 142, and the snap ring edge 58, formed by the radially outer peripheral wall 48 and axially inner face 44 of the snap ring 40, engages the wall 156, the snap ring is inhibited from pivotally deforming to a dished configuration in response to axially outward thrust loads induced thereon by the bearing race 32. As with the embodiments of FIGS. 1–3, this embodiment of FIG. 6 can be subjected to the staking operation discussed with respect to FIGS. 4 and 5 to insure that a closely spaced relationship exists between the bearing race 32 and trunnion 24.

Figure 7:
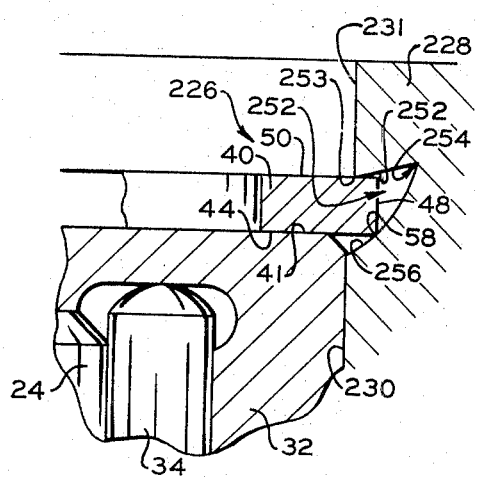

FIG. 7 discloses another modification of this invention wherein a groove 242 is formed in the cross hole 226 of a yoke arm 228 in a manner similar to the formation of the groove 42 of FIGS. 1–3, and the axially outer wall 252 of the groove 242 is inclined radially and axially outwardly from the opening thereof. As in the embodiment of FIG. 6 there is no distinct radially outer peripheral wall of the groove 242. The axially inner wall 256 of the groove is inclined axially and radially inwardly from the radially outer end of the axially outer wall 252 and intersects the axially inner wall 230 of the cross hole 226 at a location axially inwardly with respect to the face 44 of the snap ring 40 and the axially outer face 41 of the race 32. Accordingly, in effect, the peripheral wall of the groove 242 resides solely in the junction of the walls 252 and 256 and is indicated at 254. When viewed in cross section, the axially inner wall 256 is formed concavely arcuately with respect to the snap ring 40 and the wall 252. The radially outer and axially inner peripheral edge 58 of the snap ring 40 engages the wall 256 and the edge 253, formed by the junction of the axially outer wall 252 and the wall 231 of the cross hole 226, engages the axially outer face 50 of the snap ring, so that the snap ring is inhibited from pivotally deforming to a dished configuration in response to axially outward thrust loads imposed theron by the bearing race 32 as described with respect to the embodiments of FIGS. 1–3 and 6. Further, the embodiment of FIG. 7 can be subjected to the staking operations as described in FIGS. 4 and 5.

Referring now to FIG. 8, it is seen that a reversal of the securing means with respect to the placement of the groove and snap ring can be accommodated while practicing this invention. A yoke arm 66 having a cylindrical cross hole 68 therein of uniform diameter mounts a cup shaped bearing race 70 pressed into the cross hole 68 from the axially outer end thereof and positioned intermediate the arm 66 and a trunnion 72 mounted for pivotal movement with respect thereto. The arm 66 is provided with a flat annular shoulder 73 on the axially inner end thereof and the bearing race 70 projects axially inwardly of the shoulder. The axially outer cylindrical periphery 74 of the bearing race 70, that is, the portion of the bearing race's peripheral wall which is disposed in the cross hole 68 and engaging the wall 69 thereof, terminates at its axially inner end in a peripheral annular groove 76; the opening of the groove 76 overlying, i.e., extending both axially inwardly and outwardly, the shoulder 73. The cylindrical periphery 78 of the bearing race axially inwardly of the groove 76 is of smaller diameter than the periphery 74 and thus serves as a piloting portion when the bearing race 70 is pressed into the cross hole 68 from the outer end thereof. Further, the smaller diameter of the periphery 78 insures that no loads are imposed theron by the engagement of the periphery 78 with the wall 69 of the cross hole 68 as the bearing race is pressed into the cross hole, which loads might tend to break the bearing race at this location or perhaps force a portion of the race into the groove 76 or otherwise damage the groove.

The axially inner wall 80 of the groove 76 is shown as lying in a plane perpendicular to the axis of the cross hole 68 and the radially inner peripheral wall 82 of the groove 76 extends axially outwardly from the wall 80 and terminates at a position which is axially inwardly of the shoulder 73. The axially outer wall 84 commences at the axially outer end of the wall 82 and extends in an angular manner both axially radially outwardly therefrom to terminate at the periphery 74 of the bearing race 70. Thus, the groove 76 terminates the peripheries 74 and 78 since it lies therebetween, the groove axially overlies the shoulder 73 and the wall 84 extends both axially inwardly and outwardly of the shoulder.

A snap ring 86 is disposed in the groove 76 and in engagement with the shoulder 73 to prevent axially outward movement of the bearing race 70 with respect to the arm 66. It should be noted that as the race 70 attempts to move outwardly, it induces an axially inward reaction load on the snap ring where the latter engages the shoulder 73. Further, since the periphery 78 of the race is smaller than the periphery 74 thereof, the snap ring will tend to pivotally deform about the edge formed by the junction of the shoulder 73 and the wall 69 of the arm 66. The snap ring 86 is of the conventional type which is circumferentially interrupted and diametrically expansible; the diameter of the ring in its free state being less than the diameter of the radially inner wall 82 of the groove 76. The snap ring 86 is adapted to have its circumferentially spaced ends (not shown) suitably forced away from each other to increase the ring's diameter and then, after the ring is cooperatively positioned with the groove 76, the expanding force on the ring is released and the ring reduces its diameter and moves into the groove. The axially inner face 88 of the ring engages the axially inner wall of the groove 76 while the radially inner periphery 90 of the snap ring is spaced from the radially inner wall 82 of the groove. The radially outer portion of the axially outer face 92 of the snap ring 86 engages the shoulder 73 while the radially inner and axially outer peripheral edge 93 of the snap ring 86, formed by the intersection of the faces 90 and 92 thereof engages the axially outer wall 84 of the groove 76. Thus, upon the bearing race 70 attempting to move axially outwardly with respect to the arm 66, pivotal deformation to a dished configuration of the snap ring 86 about the edge formed by the junction of the shoulder 73 and the wall 69 of the cross hole 68 is inhibited by the engagement of the snap ring 86 with the axially outer wall 84 of the groove 76.

Referring now to FIG. 9, a gear 100 is rotatably mounted on a shaft 102 and interposed between the bore 104 of the gear and the periphery 106 of the shaft is an anti-friction bushing 108; the bushing being pressed on the shaft. The shaft 102 is provided with a pair of axially spaced grooves 110 and 112 respectively receiving annular snap rings 114 and 116; and, thus, the assembly of the shaft and bushing has a first diameter indicated by the numeral 103 and a second diameter, larger than the first diameter, indicated by the numeral 103A. The snap rings 114 and 116 engage the axially opposed end faces or shoulders 117 and 118 of the gear and 119 and 120 of the bushing 106 respectively and inhibit axial movement thereof with respect to the shaft 102; it should be noted that the gear 100 engages the snap rings at a position which is disposed radially outwardly from the position at which the snap rings are engaged by the periphery of the shaft 102 at the diameter portion 103 thereof so that axially outward loads on the snap rings by the gear tend to induce dishing deformation of the snap rings. The opening of the grooves 110 and 112 overlies the end faces of the gear 100 and bushing 106 and, further, the radially inner wall 121 of each of the grooves is of an axially less dimension than the axial dimension of the opening of the groove. The axially inner walls 122 and 123 respectively of the grooves 110 and 112 are inclined radially outwardly and axially inwardly with respect to the radially inner wall 121 of the grooves and thus are non-parallel with respect to the axially outer walls 124 and 125 of the grooves 110 and 112 respectively. The axially inner walls 122 and 123 extend both axially inwardly and outwardly of the end faces 117, 119 and 118, 120 of the gear and bushing 100 and 106 respectively.

The axially outer faces of the snap rings 114 and 116 adjacent the inner periphery thereof engage the axially outer walls 124 and 125 of the grooves 110 and 112 respectively, while the axially inner faces of the snap rings 114 and 116 adjacent the radially outer periphery thereof engage the end faces 117, 119 and 118, 120 of the gear and bushing respectively. When the snap rings 114 and 116 are urged axially outwardly by the gear and/or bushing, they are inhibited from pivotal deformation to a dished configuration by the engagement between the radially and axially inner edge of the snap rings 114 and 116 with the walls 122 and 123 respectively.

While several embodiments of this invention have been shown and described it is readily apparent that changes can be made therein without departing from the scope of this invention as defined by the following claims.

What is claimed is:

1. An article of manufacture comprising in combination
   (a) a first member having a bore with said bore having an axis,
   (b) a second member disposed in said bore and movable axially relative thereto,
   (c) one of said members having an annular groove means therein lying generally in a plane perpendicular to said axis and which groove means has a groove bottom,
   (d) the other of said members including a shoulder means thereon positioned adjacent said groove means and facing in a first axial direction,
   (e) said one member having an overlying portion thereof disposed on both axial sides of said shoulder means and in which portion said groove means is formed such that the openings of said groove means axially overlies said shoulder means in both said first axial direction and in a second axial direction opposite to said first axial direction,
   (f) said overlying portion includes first and second circumferentially extending surface means disposed on opposed axial sides of said groove means, said second surface means being disposed in said second axial direction with respect to said groove means and being closely spaced with respect to said other member and terminating axially in said second direction with respect to said shoulder means, said first surface means being disposed in said first axial direction with respect to said groove means and being at a lesser radial distance with respect to the bottom of said groove means than said second surface means,
   (g) and an annular resilient means having a first portion thereof disposed in said groove means and a second portion thereof extending radially from said first portion and out of said groove means and abutting said shoulder means for inhibiting said other member from moving in said first direction relative to said one member,
   (h) said groove means including means for inhibiting said first portion of said resilient means from moving in either axial direction with respect to said one member and said resilient means from pivoting relative to said groove means in response to loads applied to the second portion of said resilient means in said first direction by said shoulder means thereby inhibiting said resilient means from pivotally deforming to a dished configuration.

2. An article of manufacture according to claim 1 wherein said annular resilient means is a snap ring having radially inner and outer peripheries, one of said peripheries being formed on the first portion of said snap ring and being disposed in said groove means and the other of said peripheries being formed on the second portion of said snap ring and spaced radially from said one periphery, said snap ring having first and second axially opposed faces with said first face facing said first axial direction and said second face facing said second axial direction, said groove means engaging said first face and the peripheral edge defined by the junction between said second face and said first periphery of said snap ring and being spaced from the remainder of said second face, and the bottom of said groove means being spaced from said snap ring.

3. An article of manufacture according to claim 2 wherein said article is a universal joint, said first member is a yoke arm with said bore extending therethrough, said second member is a trunnion receiving cup shaped bearing race disposed in said bore, said shoulder means is the axially outer face of said bearing race, said annular groove means is formed in said yoke arm within said bore therein, said second surface means is the axially inner portion of said bore and said first surface means is the axially outer portion of said bore and has a diameter which is greater than the axially inner portion of said bore and greater than the diameter of said bearing race.

4. An article of manufacture according to claim 3 wherein circumferentially spaced portions of said yoke arm surrounding the axially outer end of said bore therein are deformed axially inwardly thereby axially inwardly deforming aligned axially outer portions of said groove means in an axially inward direction, and said axially inwardly deformed portion of said groove means abuttingly engaging the first face of said snap ring.

5. An article of manufacture according to claim 3 wherein the edge formed by the junction of the axially outer face of said bearing race with the peripheral wall of said bearing race is relieved axially and radially inwardly and spaced radially inwardly from said first member and axially inwardly from said snap ring.

6. An article of manufacture according to claim 2 wherein said article is a universal joint, said first member is a yoke arm with said bore extending therethrough, said second member is a trunnion receiving cup shaped bearing race disposed in said bore with the axially inner end of said bearing race projecting axially inwardly from said yoke arm and out of said bore, said shoulder means is formed on an axially inwardly facing portion of said yoke arm, said annular groove means is formed in said bearing race, said second surface means is the axially outer portion of said bearing race received in said bore, and said first surface means is the axially inner portion of said bearing race projecting axially inwardly from said arm and has a diameter which is smaller than the axially outer portion of said bearing race and smaller than the diameter of said bore.

7. An article of manufacture comprising in combination
   (a) a first member having an axially extending bore
   (b) a second member disposed in said bore and movable axially relative thereto,
   (c) one of said members having an annular groove means therein lying generally in a plane perpendicular to said axis,
   (d) the other of said members including a shoulder means thereon positioned adjacent said groove means and facing in a first axial direction,
   (e) said one member having an overlying portion thereof disposed on both axial sides of said shoulder means and extending in said first axial direction and in a second axial direction opposite to said first direction, and in which portion said groove means is formed such that the opening of said groove means axially overlies said shoulder means,
   (f) said groove means having axially opposed first and second generally radially extending walls and a bottom,
   (g) said overlying portion includes first and second circumferentially extending surface means disposed on opposed axial sides of said groove means, said second surface means being disposed in said second axial direction with respect to said groove means and being closely spaced with respect to said other member and terminating axially in said second direction with respect to said shoulder means, said first surface means beind disposed in said first axial direction with respect to said groove means and being at a lesser radial distance with respect to the bottom of said groove means than said second surface means,
   (h) an annular resilient means having a first portion thereof disposed in said groove means and a second portion thereof extending radially from said groove means and abutting said shoulder means for inhibiting said other member from moving in said first direction relative to said one member, (i) said annular resilient means having radially inner and outer peripheries and a first and second face with said first face facing in said first axial direction and said second face facing in said second direction and engaging said shoulder means, (j) one of said walls having an abutting portion thereof facing in said second axial direction and abutting said first face for inhibiting movement of said annular resilient means in said first axial direction, (k) the other of said walls and said resilient means being in engagement with each other and including means for inhibiting said second portion of said resilient means from moving in said second axial direction upon the imposition on said resilient means of forces in said first direction by said other member.

8. An article of manufacture according to claim 7 wherein the other of said walls has an abutting portion abuttingly engaging the first portion of said resilient means disposed in said groove means, said other wall facing in said first direction and inhibiting the first portion of said resilient means from moving in said second direction, and at least the abutting portion of said other wall being generally inclined with respect to said one wall and facing said shoulder means and extending in both said first and said second axial directions with respect to said shoulder means.

9. An article of manufacture according to claim 8 wherein the abutting portion of said one wall is at least the portion of said one wall adjacent the opening of said groove means, and the abutting portion of the other of said walls is disposed radially inwardly of said groove from the opening thereof.

10. An article of manufacture according to claim 9 wherein means circumferentially spaced about the abutting portion of said one wall project axially in said second direction from the remainder of said one wall and engage said first face of said resilient means.

11. An article of manufacture according to claim 9 wherein the bottom of said groove means is of a lesser axial dimension than the opening of said groove means, said other of said walls commences at the bottom of said groove means and extends radially therefrom while being inclined axially in said second direction with respect to said one wall, said abutting portion of said other wall being positioned radially intermediate the radial ends of said other wall, said resilient means being spaced from the bottom of said groove means while the resilient affect of said resilient means tending to urge the same towards the bottom of said groove means.

12. An article of manufacture according to claim 11 wherein said resilient means has a circumferentially extending edge formed by the junction of said second face and the periphery of said resilient means on the first portion thereof and said abutting portion of said other wall abuttingly engages said edge.

13. An article of manufacture according to claim 8 wherein said one of said members is said first member, said other of said members is said second member, said second member has a cylindrical periphery, said overlying portions are the cylindrical walls surrounding said bore, and the portion of said cylindrical wall disposed in said first axial direction with respect to said groove means has a diameter which is greater than the diameter of the portion of said cylindrical wall disposed axially in said second direction with respect to said groove means and greater than the diameter of the cylindrical periphery of said second member.

14. An article of manufacture according to claim 8 wherein said other member is said first member, said one member is said second member and has a cylindrical periphery, and the diameter of the portion of said one member disposed axially in said first direction with respect to said groove means is smaller than the diameter of the portion of said one member disposed in said second axial direction with respect to said groove means and smaller than the diameter of said bore.

15. An article of manufacture according to claim 12 wherein said other member is said first member, said one member is said second member and has a cylindrical periphery, and the diameter of the portion of said one member disposed axially in said first direction with respect to said groove means is smaller than the diameter of the portion of said one member disposed in said second axial direction with respect to said groove means and smaller than the diameter of said bore.

16. An article of manufacture according to claim 12 wherein said one of said members is said first member, said other of said members is said second member, said second member has a cylindrical periphery, said overlying portions are the cylindrical walls surrounding said bore, and the portion of said cylindrical wall disposed in said first axial direction with respect to said groove means has a diameter which is greater than the diameter of the portion of said cylindrical wall disposed axially in said second direction with respect to said groove means and greater than the diameter of the cylindrical periphery of said second member.

17. An article of manufacture according to claim 16 wherein circumferentially spaced portions of said first member disposed axially in said first direction with respect to said groove means are deformed axially in said second direction to reduce the axial dimension of the opening of corresponding circumferentially spaced portions of said groove means.

18. An article of manufacture according to claim 16 wherein the edge formed by the junction of said shoulder means and said cylindrical periphery of said first member is relieved axially and radially inwardly and said relieved edge is spaced radially inwardly from said first member and axially inwardly from said second face of said resilient means.

References Cited

UNITED STATES PATENTS

| | | | |
|---|---|---|---|
| 1,767,217 | 6/1930 | Kraft | 287—135 X |
| 1,810,093 | 6/1931 | Timson | 308—236 X |
| 1,993,357 | 3/1935 | Braun et al. | 64—17 |
| 2,020,253 | 11/1935 | Braun | 64—17 |
| 2,107,497 | 2/1938 | Padgett | 64—17 |
| 2,509,081 | 5/1950 | Bluth et al. | 287—135 X |
| 2,552,166 | 5/1951 | Gardiner. | |
| 2,595,787 | 5/1952 | Heimann | 287—135 |
| 3,178,907 | 4/1965 | Lyons | 64—17 |

FOREIGN PATENTS

| | | |
|---|---|---|
| 1,001,170 | 8/1965 | Great Britain. |

HALL C. COE, *Primary Examiner.*